(12) United States Patent
Argote et al.

(10) Patent No.: US 10,190,440 B2
(45) Date of Patent: Jan. 29, 2019

(54) EMERGENCY SHUT-DOWN DETECTION SYSTEM FOR A GAS TURBINE

(71) Applicant: Rolls-Royce North American Technologies, Inc., Indianapolis, IN (US)

(72) Inventors: Christopher Argote, Indianapolis, IN (US); John K. Harvell, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 262 days.

(21) Appl. No.: 15/149,263

(22) Filed: May 9, 2016

(65) Prior Publication Data

US 2016/0363001 A1    Dec. 15, 2016

Related U.S. Application Data

(60) Provisional application No. 62/173,400, filed on Jun. 10, 2015.

(51) Int. Cl.
*F02C 9/28*   (2006.01)
*F01D 21/06*  (2006.01)
(Continued)

(52) U.S. Cl.
CPC ......... *F01D 21/14* (2013.01); *F01D 21/003* (2013.01); *F01D 21/04* (2013.01); *F01D 21/045* (2013.01);
(Continued)

(58) Field of Classification Search
CPC ........ F01D 21/14; F01D 21/04; F01D 21/045; F01D 21/06; F02C 3/04; F02C 9/48; F02C 9/46; F02C 9/28; F05D 2270/09; F05D 2260/80; F05D 2270/101; F05D 2270/304; F05D 2270/301

See application file for complete search history.

(56) References Cited

U.S. PATENT DOCUMENTS 4,045,955 A * 9/1977 Brannstrom .............. F02C 9/32
                                              60/39.281
4,275,557 A * 6/1981 Marvin .................... F02C 9/28
                                              60/39.281
(Continued)

FOREIGN PATENT DOCUMENTS

EP    2574735 A1    4/2013
EP    2722493 A2    4/2014
(Continued)

OTHER PUBLICATIONS

Soria, "Gas Turbine Shaft Over-speed / Failure Modelling Aero/Thermodynamics Modelling and Overall Engine System Response," Apr. 2014, pp. 1-261.*

*Primary Examiner* — Ted Kim
(74) *Attorney, Agent, or Firm* — Maginot, Moore & Beck, LLP

(57) ABSTRACT

A gas turbine engine is provided with a controller configured to detect a spool shaft failure and to initiate an engine shut-down in response to the shaft failure. The controller evaluates the compressor speed probe, the speed probe continuity, P30 pressure and compressor surge to determine whether a shaft failure has occurred.

7 Claims, 3 Drawing Sheets

(51) Int. Cl.
  *F01D 21/14* (2006.01)
  *F01D 21/04* (2006.01)
  *F04D 27/00* (2006.01)
  *F02C 9/46* (2006.01)
  *F02C 9/48* (2006.01)
  *F01D 21/00* (2006.01)
  *F02C 3/04* (2006.01)
  *F04D 27/02* (2006.01)

(52) U.S. Cl.
  CPC .............. *F01D 21/06* (2013.01); *F02C 3/04* (2013.01); *F02C 9/28* (2013.01); *F02C 9/46* (2013.01); *F02C 9/48* (2013.01); *F04D 27/001* (2013.01); *F04D 27/0292* (2013.01); *F05D 2260/80* (2013.01); *F05D 2270/09* (2013.01); *F05D 2270/101* (2013.01); *F05D 2270/301* (2013.01); *F05D 2270/304* (2013.01); *F05D 2270/807* (2013.01)

(56) References Cited

U.S. PATENT DOCUMENTS

| | | | | |
|---|---|---|---|---|
| 4,327,294 A | * | 4/1982 | Smith | F01K 23/105 290/40 C |
| 6,176,074 B1 | * | 1/2001 | Thompson | F01D 21/045 60/39.091 |
| 6,607,349 B2 | * | 8/2003 | Mulera | F01D 21/04 415/1 |
| 7,703,270 B2 | | 4/2010 | Lefebvre et al. | |
| 7,780,400 B2 | | 8/2010 | Bilson | |
| 7,934,367 B2 | | 5/2011 | Mons | |
| 8,127,525 B2 | | 3/2012 | Bart et al. | |
| 8,161,727 B2 | | 4/2012 | Bart et al. | |
| 8,371,804 B2 | | 2/2013 | Bilson et al. | |
| 2007/0031078 A1 | * | 2/2007 | Hackett | F01D 25/164 384/535 |
| 2007/0241921 A1 | * | 10/2007 | Arguello | F01D 21/045 340/679 |
| 2010/0000222 A1 | * | 1/2010 | Price | F01D 15/10 60/773 |
| 2010/0324799 A1 | * | 12/2010 | Davison | F02C 9/00 701/100 |
| 2011/0213537 A1 | | 9/2011 | Dooley et al. | |
| 2013/0071230 A1 | | 3/2013 | Kulczyk | |
| 2013/0192242 A1 | | 8/2013 | Davis et al. | |
| 2015/0285092 A1 | * | 10/2015 | Chevalier | F02C 9/20 415/1 |
| 2015/0292348 A1 | * | 10/2015 | Pasquier | F01D 17/06 701/3 |
| 2016/0363000 A1 | * | 12/2016 | Oates | F01D 21/04 |

FOREIGN PATENT DOCUMENTS

| | | |
|---|---|---|
| WO | 9964727 | 12/1999 |
| WO | WO-2014/076398 * | 5/2014 |

* cited by examiner

EMERGENCY SHUT-DOWN DETECTION SYSTEM FOR A GAS TURBINE

This application claims the benefit of priority of U.S. provisional application Ser. No. 62/173,400 filed on Jun. 10, 2015, the disclosure of which is herein incorporated by reference in its entirety.

BACKGROUND

The present disclosure relates to a device and method for detecting an emergency condition for shutting down a gas turbine engine, and particular to a device and method that detects a shaft failure of the gas turbine engine.

Gas turbine engines have been well known in the art for many years, and are engines in which a shaft is used to transmit the torque delivered by a turbine assembly to a compressor assembly. The compressor is used to pump a working fluid (typically air) through the engine, a combustion system (located between the compressor and turbine) is used to add thermal energy to the working fluid, the turbine assembly is used to extract work from the working fluid to drive the compression system, and the residual energy in the working fluid is used to provide shaft power (turboshaft, or turboprop) or motive thrust (turbojet or turbofan).

Engines have been created which incorporate from one to any number of shafts, typically designated as single, dual, triple spool or multi-spool engines. Multi-spool engine designs will generally include two or three coaxial drive shafts. In a dual spool engine, a low pressure compressor is connected by a first coaxial drive shaft to a low pressure drive turbine. Downstream of the low pressure compressor assembly is a high pressure compressor which is connected to a second coaxial drive shaft which is driven by a high pressure turbine assembly.

A similar arrangement is provided in a three spool engine design except that there is now a low, intermediate, and high pressure compressor assembly that are each connected respectively to low, intermediate, and high pressure turbine assemblies. In some configurations, a final turbine assembly may be used to drive an external load rather than driving a second or third compressor assembly, in which case the turbine assembly is often referred to as the power turbine.

Whether the engine is the single, dual, or triple spool type, the drive shafts must be capable of rotating at thousands of rpm's for hours at a time, with significant variations in operating temperature, acceleration demands, centrifugal stress, axial stress, etc. In extremely rare instances during the life of an engine, situations can occur where the load on a drive shaft exceeds design limits which may result in failure of the affected shaft. Failure or "decoupling" of one or more of the engine shafts will generally occur suddenly and can lead to an uncontained failure of the released turbine assembly.

When a gas turbine engine experiences a shaft failure between the compressor and turbine assemblies, the entire failure sequence may occur in less than one second, and will result in the sudden deceleration of the affected compression system, while the turbine assembly rotating components will experience an unregulated and rapid acceleration. The rapid acceleration of the turbine assembly poses the greatest hazard to the engine and vehicle because the increased rotational velocity may introduce forces on rotating assembly that exceed the mechanical strength limits of the assembly.

When rapid acceleration occurs the turbine assembly will experience a failure of the disk or blade components leading to the release of high energy debris. Most gas turbines are not designed to contain such high energy release of failed hardware due to weight and cost constraints. On a jet aircraft, an uncontained turbine disk or blade failure could result in serious damage to other engines or aircraft hardware and could result in loss of the aircraft. Aviation safety regulators mandate that in the event of a shaft break the gas turbine must not release high energy debris.

Various attempts have been made to contain a component burst through the engine housing. In one such attempt, a solid containment ring formed of high strength material, such as a nickel cobalt alloy has been integrated into the outer engine housing to circumferentially surround the rotating components of the engine. Although such containment rings have been successful in containing fragmented components within the engine housing, they add a significant amount of additional weight to the engine, thus sacrificing fuel economy and passenger capacity. It is desirable to detect and act on a shaft failure event quickly, to prevent excessive stresses on the released turbine components.

Because shaft failure indications may only be available for a short time (fractions of a second) before the turbine rotating components start to fragment, it is evident that such a warning protocol must be automated, preferably in the form of a control logic utilized by a high-speed on board processor. If a shaft failure can be detected quickly and the engine can be shut down while the engine is displaying the early warning signs of shaft failure, and before any component fragmentation occurs, the need for using heavy containment rings can be eliminated. Additional damage to the engine resulting from the high speed component fragmentation can be eliminated as well. In this fashion, the safety of the operational engine can be significantly improved, the potential for component fragmentation can be eliminated and the safety and integrity of the vehicle maintained.

As mentioned above, gas turbine engines (e.g. jet engines) include a rotating shaft having a compressor and/or a turbine assemblies mounted thereon and rotating therewith. Excessive axial movement of the shaft supporting the turbine and compressor assemblies relative to the static structures of the engine is considered to be abnormal and indicative of engine failure (e.g. shaft breakage). Detection of axial movement of the shaft relative to the remainder of the engine can therefore be used to detect engine failure and to activate a shut off of the engine. If the shaft linking the turbine to a compressor is broken, the loads on the turbine assembly will act to push it backwards (towards the engine exhaust). The compressor loads however will act to push it forward (towards the engine intake) even as the compressor rapidly decelerates. The turbine elements will increase rotational speed due to the loss of the compressor load and the continued availability of energy from the combustion system.

Previous systems for detecting turbine shaft failure have relied on continuity systems to detect abnormal movement of a turbine assembly relative to the engine casing. In those systems, when the axial movement of the turbine assembly exceeds a minimum level, the turbine assembly breaks a continuity circuit and in so doing shuts off fuel flow to the engine. In another system, movement of the circuit breaking element relative to the shaft breaks a circuit and thereby produces a signal. In a further approach, an electro-optic sensor senses unwanted or abnormal axial movement of turbine blades or rotors of a gas turbine.

Another form of a broken shaft detection system uses a detector assembly mounted downstream of a power turbine wheel of a gas turbine engine to detect rearward axial motion of the wheel indicative of a broken shaft event. The detector assembly has a plunger positioned to be axially displaced against a link connected in an electrical circuit which may be broken when the plunger is displaced thereby creating an open circuit that may be detected by a detection and test element. This detection may be communicated to an over-speed circuit that controls a shut-off switch that interrupts fuel flow to the engine. In another approach, a frangible sensor element is cut by a separating tang mounted on and moving axially with a gas turbine shaft when the shaft fails. The systems employed in the prior art thus rely on the addition of electrical and mechanical components to the engine, which increases the weight and complexity of the engine.

It is very important to avoid false shaft failure detection events. Typically a sensor monitoring for shaft breakage is directly coupled to a fuel cut-off circuit to automatically and quickly shut off the engine when the shaft breaks. A false detection would therefore lead to an unwarranted shut down of the engine which by itself increases the threat to the vehicle. For systems relying upon electrical circuits, discrepancies in the performance of the detection circuit itself can trigger a false shaft break signal.

SUMMARY

According to one aspect of the present disclosure a gas turbine engine comprises at least one compressor and combustor, a turbine coupled to the compressor by a spool, and an electrical compressor speed sensor located in front of the compressor (toward the compressor inlet). The speed sensor includes an electrical continuity circuit to provide built-in test capability to verify acceptable continuity of the electrical speed sensor. The engine further comprises a controller having a number of inputs for receiving at least one measured engine parameter and a number of outputs for transmitting control signals which regulate engine operation variables. In one aspect, the controller includes an input for receiving the speed signal and the continuity signal, and is configured to generate a signal to shut down engine operation in response to a loss of both the speed signal and the continuity signal. In one feature of the presently disclosed system, shaft failure will result in the loss of both the speed and continuity signals. Multiple speed sensors may be provided and the controller may be configured to generate an engine shut down signal only when there is a loss in both speed and continuity signals for all of the speed sensors.

In another aspect, the engine further comprises a pressure sensor operable to generate a pressure signal in response to a fluid pressure within the compressor, such as the P30 pressure (compressor exit pressure). The controller receives the pressure signal as an input and is configured to use that signal to decide whether a fast fuel shut-off is necessary in the event of the shaft failure event. If the pressure does not exceed a minimum pressure threshold, even if the shaft has failed an emergency shut-down is not required.

In a further aspect, the controller may be optionally configured to detect compressor surge and to generate a signal indicating that a compressor surge has occurred. The controller is further configured to generate an engine shut-down signal when a surge signal is received at the same time that the P30 pressure exceeds the minimum threshold, detected as described above, and a shaft failure is indicated. In this embodiment, compressor surge is an expected response to a spool shaft failure. In this embodiment, the controller will only command an engine shut-down when four conditions are present—a speed probe fault, a continuity fault, the P30 compressor pressure exceeds a minimum pressure threshold and a compressor surge is indicated. Commanding engine shut down only when all four conditions are met significantly reduces the risk of false shaft failure detection.

In a further aspect of the disclosure a method is provided for shutting down a gas turbine engine that comprises detecting a fault in a signal from a compressor speed probe upstream of the spool connecting a compressor to a turbine, detecting a fault in a continuity signal for the compressor speed probe, and commanding an engine shut down in response to the detection of a fault in both the speed probe signal and the continuity signal. In a further feature, the method comprises detecting the P30 pressure of the engine, and commanding the engine shaft failure induced shut down only when the P30 pressure signal exceeds a predetermined threshold value related to the disc burst threshold for the engine. In a further aspect, when the P30 pressure condition is met, the engine shut down may be commanded only if a compressor surge condition is also detected.

DETAILED DESCRIPTION

Figure 1:
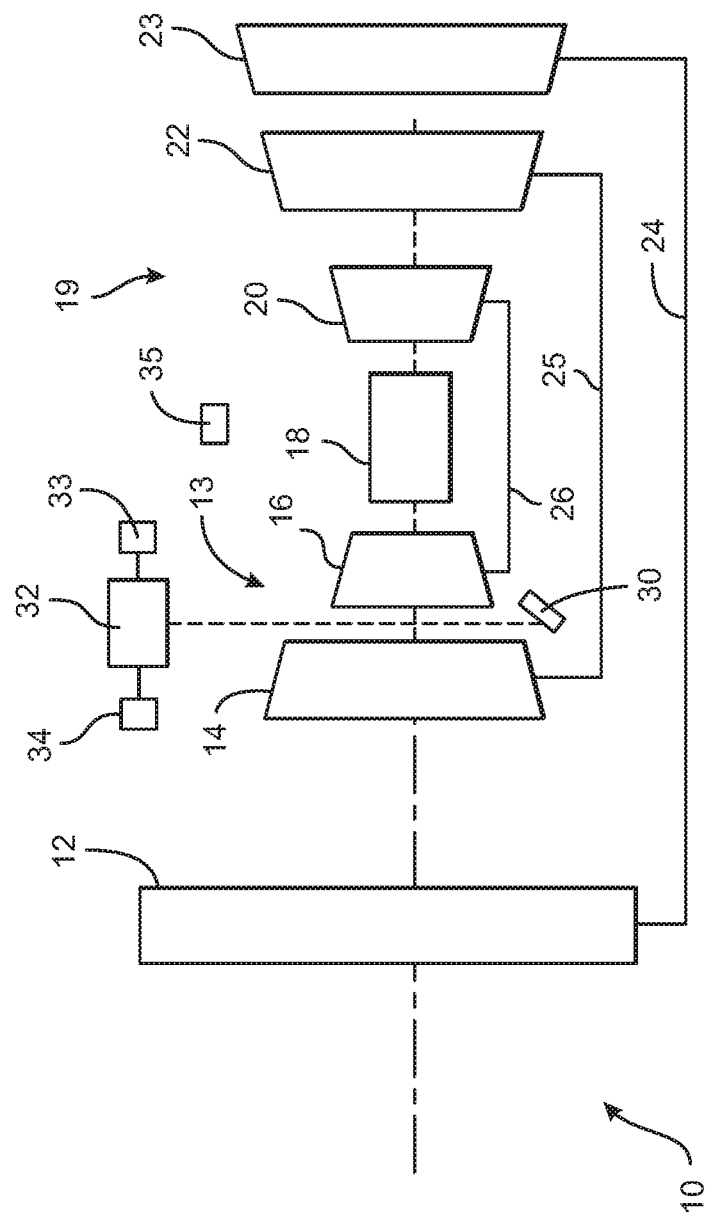
FIG. 1 is a schematic of a multi-stage gas turbine engine.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
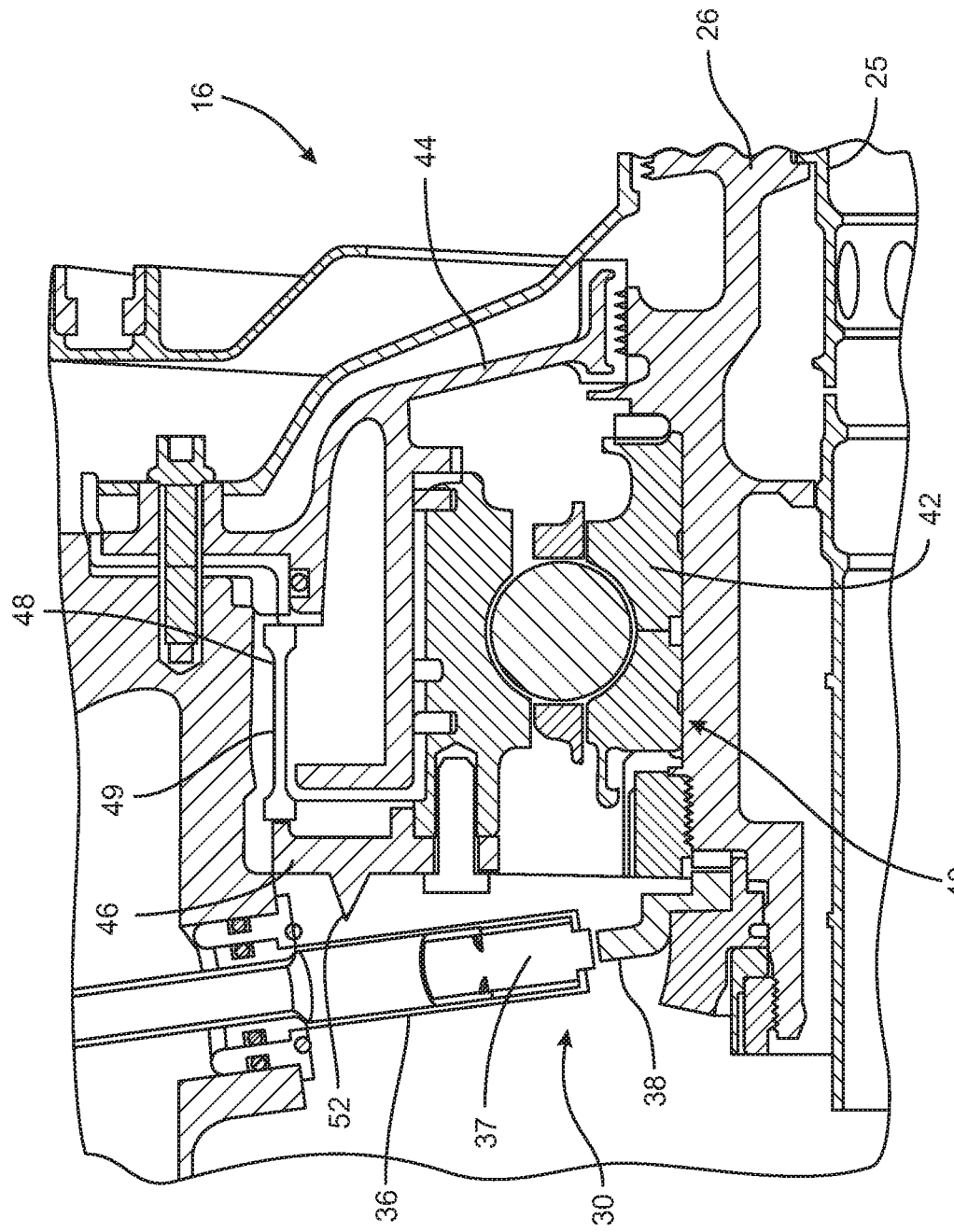
FIG. 2 is an enlarged cross-sectional view showing the location of a compressor speed probe and compressor bearing in a gas turbine engine such as the engine shown schematically in FIG. 1.

The schematic representation of a three-spool gas turbine engine 10 is shown in FIGS. 1-2. In particular, the engine 10 includes in sequence a low pressure (LP) fan 12, compressor components 13 including an intermediate pressure (IP) compressor 14, a high pressure (HP) compressor 16, a combustor 18, and turbine components 19 including a HP turbine 20, an IP turbine 22 and a LP turbine 23. The LP turbine 23 is coupled to a LP spool 24 that drives the LP fan 12. It is noted that in some two-spool engines the LP fan may be driven by the first compressor component through a gearbox. In the three-spool engine shown in FIG. 1, the IP turbine 22 is coupled to an IP spool 25 that drives the IP compressor 14, while the HP turbine 20 drives the HP compressor 16 through the HP spool 26.

The gas turbine 10 includes an engine controller 32 that may be a digital engine controller having a memory and configured to execute program or software instructions to control the engine operating parameters. In particular, the controller 32 includes a number of inputs for receiving at least one measured engine parameter, a processor for generating control signals for controlling engine operation variables and a number of outputs for transmitting the control signals to appropriate control components, such as a fuel system metering valve or controller 35 operable to control fuel supplied to the combustor 18. Among the inputs is an input for receiving compressor speed data. In particular, the engine includes a speed probe 30 positioned adjacent the HP compressor 16. In one embodiment, the speed probe 30 may be an inductive device that contains a pick-up coil with a magnetized core 37 mounted in close proximity to a phonic wheel 38 mounted on a spool shaft, such as spool 26. The phonic wheel is essentially a toothed wheel that rotates with the spool so that the passage of each tooth by the probe 30 causes a variation in magnetic flux to thereby generate an alternating voltage in the pick-up coil. This alternating voltage signal is sensed by the controller 32 and software or firmware within the controller to convert this alternating voltage into a shaft speed value. The controller uses this shaft speed value in conjunction with other data indicative of engine performance to control the operation of the engine. For instance, the controller 32 may be operable to execute software or firmware to detect a turbine overspeed condition when the shaft speed value obtained from the speed probe signal exceeds a predetermined stored value, and then to command a fuel reduction to the combustor to thereby reduce the engine and turbine speed.

The speed probe 30 incorporates an electrical continuity circuit that is used to verify the integrity of the probe. In particular, the continuity circuit is configured to provide a continuity signal to the controller 32, and the controller is configured to continually monitor the continuity signal. When the continuity circuit is disrupted it fails to generate a continuity signal. This disruption is sensed by the controller which in turn generates an alarm or fault signal indicative of a failure of the speed sensing system. In speed probes incorporating a pick-up coil, the pick-up coil is integrated into the continuity circuit so that a loss of voltage indication from the pick-up coil is indicative of a break in the electrical continuity circuit. In this condition, the failure of the continuity signal is also indicative of a loss of speed signal because the loss of electrical continuity in the pick-up coil produces an open circuit. Loss of continuity and ultimately loss of the shaft speed signal can be caused by a variety of events, many of which do not require shutting down the engine.

In certain engines at least two independent speed probes 30 are provided at the same axial location relative to the phonic wheel 38 so that the probes read the same rotational speed. Each probe may communicate with the controller 32 or with its own associated controller, so that the continuity signal associated with each speed probe is continuously monitored. The loss of continuity of less than all of the speed probes is not interpreted by the controllers as a shaft failure. On the other hand, the simultaneous loss of continuity and shaft speed signals from all of the speed probes is highly indicative.

In accordance with one aspect of the present disclosure, the existing speed probe and continuity circuit for a gas turbine engine is used to detect a shaft decouple or shaft breakage in the HP spool 26. It is known that in a shaft decouple condition the combustion pressure forces the HP turbine stage 20 rearward (i.e., toward the exhaust) and forces the HP compressor 16 forward (i.e., toward the inlet and fan 12). The forward displacement of the HP compressor can be used to disrupt the integrity of the speed probe and/or continuity circuit. As shown in FIG. 2, the speed probe 30 may be incorporated into an HP compressor arrangement having a bearing assembly 40 that incorporates a spring arrangement between the HP compressor and a stationary housing element of the engine. As illustrated in FIG. 2, the bearing assembly 40 includes a bearing 42 mounted on the second spool 26 and supporting an inner housing 44, an outer housing 46 and a spring bar assembly 48 between the two housings. The speed probe(s) 30 is/are aligned with the teeth of the phonic wheel 38 mounted on the shaft 26. The coil, core and continuity circuit of each speed probe are contained within a corresponding housing 36.

The spring bar assembly includes a plurality of circumferentially disposed spring bars 49 that are configured to flex to absorb normal axial loads exerted on the bearing assembly 40 during operation of the engine. Further details of the bearing assembly 40 and the spring bar assembly 48 are found by reference to U.S. Published Application No. 2007/0031078, published on Feb. 8, 2007 in the name of Assignee Rolls-Royce, PLC, the entire disclosure of which is incorporated herein by reference, specifically FIGS. 1-12 and the associated written description in Paras. 0025-0040.

As shown in FIG. 2, the HP compressor speed probe(s) 30 is/are disposed immediately axially adjacent the outer housing 46. The spring bars 49 are configured to fracture when the bearing assembly is subjected to a predetermined axial force indicative axial displacement of the HP compressor 16 upon a failure of the HP spool 26. When the spring bars fracture the bearing assembly 40 translates axially forward with sufficient force to contact and fracture or sever the speed probe 30. The outer housing 46 may be provided with a protrusion 52 in the form of a knife edge, for instance, which is aligned with the speed probe 30 and particularly adapted to sever the probe.

Upon a fracture of the HP spool 26 between the HP turbine 20 and the HP compressor 16, the HP compressor generates sufficient forward axial force to fracture the spring bars 49 and to propel the bearing assembly 40 forward against the speed probe. The bearing assembly, and particularly the outer housing 46 and/or protrusion 52 moves forward with enough force to sever each speed probe 30. The speed signal and continuity signals from each speed probe to the controller(s) 32 are simultaneously terminated resulting in speed and continuity fault conditions. The controller(s) 32 is continuously monitoring the speed and continuity signals as part of the normal operation of the engine. When the two signals for each speed probe are no longer received by the controller(s) 32, software or firmware within the controller immediately generates a speed sensor fault signal and a continuity fault signal. When these fault signals are sensed, the controller immediately sends a signal to the fuel system 35 to shut-off the fuel supply to the affected engine.

Figure 3:
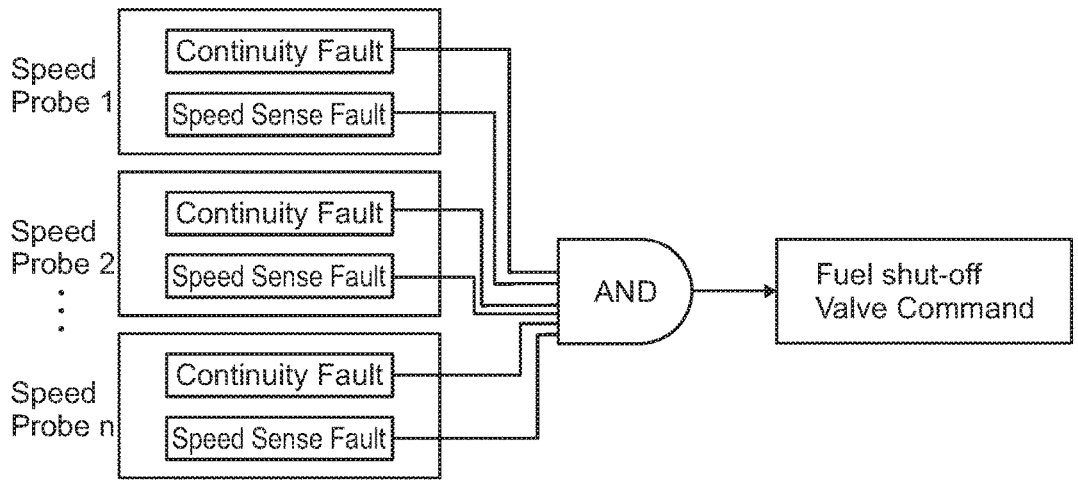
FIG. 3 is a logic diagram of a shaft failure detection and engine shut-off condition using the compressor speed probe and continuity circuit to detect the shaft failure.
Figure 4:
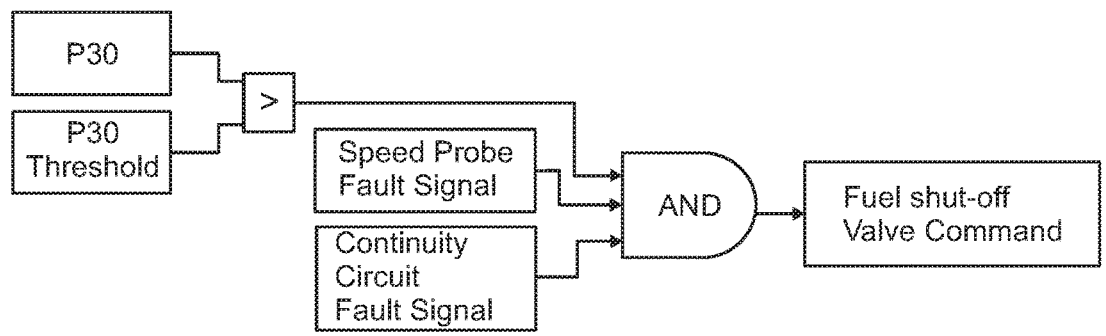
FIG. 4 is a logic diagram of a shaft failure detection and engine shut-off condition using the compressor speed probe and continuity circuit and the P30 pressure to detect the shaft failure.

The controller(s) 32 may thus implement the AND-gate logic depicted in FIG. 3 based on receipt of both a speed probe fault signal and a continuity circuit fault signal. The presence of both faults in a single speed probe at the same time reduces the chance of false detection of a shaft failure scenario. The presence of both faults in multiple speed probes, such as probes 1, 2, . . . n depicted in FIG. 3, significantly reduces the chance of false detection. For a typical two speed probe configuration, four fault signals are required to initiate a fuel shut-off command. A time component can also be incorporated into the AND-gate test, namely that the fault signals arise within a predetermined time of each other. In other words, when a shaft failure occurs, the speed probe and continuity circuit of a given speed probe are immediately compromised together. Likewise, the time element may be implemented with respect to the timing of speed and continuity faults of multiple speed probes. Any appreciable delay between the fault conditions may not be indicative of a shaft failure but of some other condition that does not require an immediate engine shut-down.

With an eye toward further minimization of false detection, the present disclosure contemplates using further data obtained or generated by the controller 32 during normal operation of the engine. In particular, the controller 32 receives data from a pressure sensor 33 downstream of the HP compressor, also known as the P30 pressure. The P30 pressure is used to provide a fuel flow set point value to control a flow metering device or fuel flow valve for delivering fuel to the combustor 18. In one aspect of the present disclosure, the engine controller 32 is operable to compare the P30 pressure value to a minimum threshold pressure that does not achieve a requisite margin to disc burst speed. If the pressure value at the exit of the HP compressor is not above that threshold, then there is no risk of a turbine failure due to an overspeed condition even if the HP shaft is compromised. Since there are other conditions in which the P30 pressure may exceed the minimum threshold that do not necessitate an engine shut-down, the controller 32 implements the AND-gate logic shown in FIG. 4 that requires both speed probe and continuity faults and P30 pressure above the minimum threshold pressure. In one aspect of the present disclosure, the engine controller 32 may implement software commands to obtain the P30 pressure value, compare it to a predetermined threshold stored value and generate a P30 fault signal if the sensed pressure exceeds the threshold. In some controllers 32 a P30 fault signal or fault bit may already exist in which case the controller 32 simply reads the available P30 fault signal and feeds the signal value to the AND-gate shown in FIG. 4.

In order to further reduce the chance of a false shaft failure detection, the present disclosure further contemplates the use of compressor surge information that is already being monitored by the engine controller 32. Surge is a phenomenon that arises in the compressor of the gas turbine engine in which the compressor pumping characteristic is compromised and can no longer maintain the adverse pressure gradient across parts of or the entire assembly. Normal operation of the compressor depends on factors such as the pressure ratio, i.e., the ratio of the outlet pressure to the inlet pressure, and the mass flow through the compressor. If the pressure ratio is too high for the current mass flow, the compressor may start to stall, which can then lead to reverse mass flow through the compressor due to the higher outlet pressure. This condition is known as surge and can result in a loss of thrust/power, excessive vibration and even damage to the engine. The engine controller 32 monitors the compressor pressure ratio and the mass flow through the compressor. If the engine controller detects a potential surge condition the engine controller activates bleed valves in the compressor in some engines to bleed some air from the core airflow through the compressor to ultimately reduce the pressure ratio. In other engines, the engine controller 32 may adjust compressor inlet guide vanes to change the compressor pressure characteristics.

Figure 5:
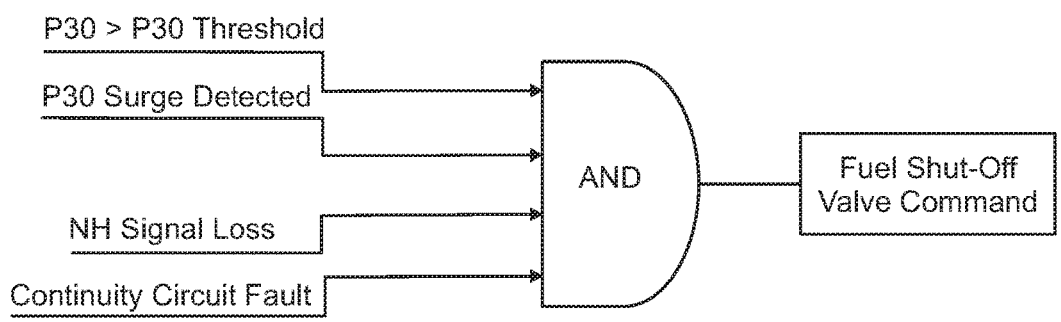
FIG. 5 is a logic diagram of a shaft failure detection and engine shut-off condition using the compressor speed probe and continuity circuit, P30 pressure and compressor surge to detect the shaft failure.

The engine controller 32 constantly monitors the pressure 34 at the exit plane of the compressor to anticipate a potential surge condition. The controller thus receives the sensor data, calculates the compressor operating characteristics (e.g., pressure ratio and mass flow, continuously compares these values to stored threshold values indicative of a surge condition, generates a surge byte or other signal if a surge condition is detected, and activates the surge recovery protocol. In accordance with the present disclosure, if a speed probe fault and continuity fault condition is sensed indicative of a shaft failure, then the engine controller 32 queries the surge data. If a surge byte or signal has been generated, the controller 32 determines that a shaft failure has occurred and issues an emergency fuel shut-off command and reports the event to a cockpit display. For the highest degree of certainty that an actual shaft failure has been detected, or put another way, for the lowest probability of a false detection, the controller 32 may only query the surge data if the P30 threshold has also been exceeded. As illustrated in FIG. 5, each of the conditions—speed probe fault, continuity fault, P30 threshold and surge—is fed to an AND logic gate so each condition must exist before the controller 32 senses a shaft failure. The combined probabilities of a "false positive" for the four conditions ultimately can lead to an overall probability of false detection of shaft failure that is negligible, on the order of one in a billion. Under certain circumstances, any one fault can be indicative of a shaft failure, but the risks of a false positive leading to engine shut down require a much higher degree of certainty, particularly since an improper engine shut-down can itself be cause for a negative event.

It can be appreciated that the shaft failure detection protocols described above can all be implemented within the existing engine controller 32 as software or firmware commands. The fault signals used in the shaft failure detection disclosed herein are all available and accessed by the controller 32 for use in controlling the operation and performance of the engine, either as a fault bit or as a data value. The shaft failure fault detection protocols disclosed herein can thus be implemented as software instructions executed by the controller to read the respective fault bits and/or data and perform the AND-gate logic illustrated in FIGS. 3-5. For some controllers the fault signals are fault bits that are either "0" when no fault condition exists or "1" when a fault exists. In this instance, the controller may incorporate a digital AND-gate that receives the fault bytes and generates a "1" only when all the fault bits are "1". The controller 32 may continuously monitor the output of the AND-gate and then issue a fuel shut-off command when the AND-gate output is "1". With either approach, the only modification required to an existing gas turbine engine is in the engine controller 43, optimally only requiring a software change or addition to the controller.

The present disclosure should be considered as illustrative and not restrictive in character. It is understood that only certain embodiments have been presented and that all changes, modifications and further applications that come within the spirit of the disclosure are desired to be protected.

What is claimed is:
1. A gas turbine engine comprising:
a fan;
an IP compressor arranged aft of the fan:
an HP compressor arranged aft of the IP compressor;
a combustor arranged aft of the HP compressor;
an HP turbine arranged aft of the combustor and coupled to said HP compressor by an HP spool;
a bearing assembly comprising a bearing mounted on the HP Spool, the bearing assembly supporting an inner housing, an outer housing and a spring bar assembly arranged between the inner housing and the outer housing, the spring bar assembly having a plurality of circumferentially disposed spring bars configured to flex, the outer housing having a protrusion;

at least one electrical speed sensor arranged fore of said HP compressor and near the protrusion, the at least one electrical speed sensor operable to provide a compressor speed signal, said at least one speed sensor including an electrical continuity circuit operable to generate a continuity signal for the electrical speed sensor;

a controller having a number of inputs for receiving at least one measured engine parameter and a number of outputs for transmitting control signals for controlling engine operation variables, said controller including an input for receiving the speed signal and the continuity signal;

wherein when the HP spool fractures, the HP compressor generates a forward axial force to fracture the spring bars causing the protrusion to sever the at least one speed probe resulting in a simultaneous termination of the compressor speed signal and continuity signal.

2. The gas turbine engine of claim 1 wherein said controller is configured to generate a speed probe fault in response to a loss of the speed signal and a continuity fault signal in response to a loss of the continuity signal, said controller further configured to generate a signal to shut down engine operation in response to detection of both the speed probe fault signal and the continuity fault signal.

3. The gas turbine engine of claim 2, further comprising:
a pressure sensor operable to generate a pressure signal in response to a fluid pressure within the HP compressor;
said controller receiving said pressure signal as an input and configured to generate the signal to shut down the engine operation only when the pressure signal exceeds a pressure threshold related to disc burst for the HP turbine.

4. The gas turbine engine of claim 3, wherein the pressure sensor senses P30 pressure of the engine.

5. The gas turbine of claim 3 wherein said controller is configured to detect compressor surge from the at least one measured engine parameter, to generate a surge signal indicative of a compressor surge condition, and to generate the signal to shut down the engine operation only when the surge signal is received.

6. The gas turbine engine of claim 1, wherein said at least one electrical speed sensor includes two speed sensors disposed in said HP compressor upstream of the HP spool, each of said two speed sensors operable to provide a compressor speed signal and including an electrical continuity circuit operable to generate a continuity signal; and said controller includes an input for receiving the speed signal and the continuity signal of each of said two speed sensors and is configured to generate a speed probe fault signal in response to a loss of the speed signal and a continuity fault signal in response to a loss of the continuity signal for each of said two speed sensors, said controller further configured to generate a signal to shut down engine operation in response to detection of both the speed probe fault signal and the continuity fault signal for both of said two speed sensors.

7. The gas turbine of claim 2 wherein said controller is configured to detect compressor surge from the at least one measured engine parameter, to generate a surge signal indicative of a compressor surge condition, and to generate the signal to shut down the engine operation only when the surge signal is received.

* * * * *